(12) United States Patent
Schrader

(10) Patent No.: US 6,952,313 B2
(45) Date of Patent: Oct. 4, 2005

(54) METHOD AND DEVICE FOR IMAGE ZOOMING

(75) Inventor: Martin Schrader, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/803,545

(22) Filed: Mar. 17, 2004

(65) Prior Publication Data

US 2004/0228002 A1 Nov. 18, 2004

Related U.S. Application Data

(60) Provisional application No. 60/455,161, filed on Mar. 17, 2003.

(51) Int. Cl.$^7$ .......................... G02B 1/06; G02B 15/14; G02B 9/00; A61F 2/16
(52) U.S. Cl. ...................... 359/666; 359/691; 359/796; 623/6.22
(58) Field of Search ............................. 359/665–667, 359/676, 691, 692, 741, 744, 793–796; 623/6.22

(56) References Cited

U.S. PATENT DOCUMENTS 6,033,070 A * 3/2000 Kearns ...................... 351/168
6,369,954 B1   4/2002 Berge et al. ................ 359/666
6,542,309 B2 * 4/2003 Guy ........................... 359/666

FOREIGN PATENT DOCUMENTS

| EP | 1 069 450 A2 | 1/2001 |
| EP | 1 271 218 A1 | 1/2003 |
| WO | WO 03/069380 | 8/2003 |

* cited by examiner

Primary Examiner—Georgia Epps
Assistant Examiner—William Choi
(74) Attorney, Agent, or Firm—Ware, Fressola, Van Der Sluys & Adolphson LLP

(57) ABSTRACT

An optical component for changing angular magnification of an imaging device. The optical component comprises a chamber having a first substrate on one side and a second substrate on the opposite side for separately disposing a first liquid drop and a second liquid drop along an optical axis. The chamber is also filled with a liquid, which is different from the first and second liquid drops. The optical component also has a first electrode adjacent to the first side, a second electrode adjacent to the second side, and a third electrode layer between the first and second electrode layers for applying different electric fields on the first and second liquid drops to change the focal lengths of the first and second liquid drops, without changing the sum of the focal lengths.

17 Claims, 8 Drawing Sheets $M = F2/F1 = \alpha_1/\alpha_2$

METHOD AND DEVICE FOR IMAGE ZOOMING

This patent application is based on and claims priority to U.S. Provisional Patent Application Ser. No. 60/455,161, filed Mar. 17, 2003.

CROSS REFERENCE TO RELATED APPLICATIONS

This patent application is related to U.S. patent application Ser. No. 10/803,794, assigned to the assignee of the instant application, and filed even date herewith.

1. Field of the Invention

The present invention relates generally to an optical system for use in a hand-held device and, more particularly, to a zoom lens in an imaging device.

2. Background of the Invention

A zoom-system can be built of two system components: the first component performs an angular magnification (but does not have any optical power), and the second component performs the focusing task so as to form on an image plane a focussed image of a certain scene or object at a selected distance. Such a zoom-system is referred to as an afocal system. FIGS. 1a and 1b show the principle of angular magnification with an afocal zoom-system. As shown in FIGS. 1a and 1b, two lenses are used to form a zoom-system and they are separated by a distance equal to the sum of their focal lengths ($F_1$, $F_2$). The magnification is given by the ratio of the second focal length to the first focal length, or $M=F_2/F_1$. The angular magnification ($\alpha_1/\alpha_2$) of the zoom-system, as shown in FIG. 1a is about 5, and that of the zoom-system, as shown in FIG. 1b, is about 1. It should be noted that angular magnification of x means a multiplication of the beam diameter by 1/x. Adding a third lens $S_3$, behind the afocal pair, as shown in FIG. 1c, will create a real image at the focal plane of the third lens. The angular magnification does not depend on the third lens, neither on its focal length nor its position.

In practice, a zoom-system is made of two groups of optical components ($S_1$ and $S_2$) so that the focal length of each group can be changed separately. In prior art, the change in angular magnification can be achieved by mechanically moving optical components to alter the focal length of at least one of the two groups and to change the separation between the groups such that the new separation distance is equal to the sum of the altered focal lengths. Alternatively, the change in angular magnification can be achieved by moving optical components to alter the focal length of both groups such that the focal length increase in one group is equal to the focal length decrease in the other group. Mechanical movement of optical components in a zoom-system is difficult to realize, especially in a small device.

Thus, it is advantageous and desirable to provide a method and device for changing the zoom factor by mechanically moving the optical components using moving means.

SUMMARY OF THE INVENTION

The present invention uses two liquid lenses aligned along a common optical axis to form an afocal zoom-system. The liquid lenses are deformed to change the focal lengths such that the sum of their focal lengths in a desirable range of angular magnification is substantially the same. As such, there is no need to change the separation distance between the two liquid lenses.

Thus, the first aspect of the present invention provides a method for changing a magnification factor of an imaging device, said method comprising:

providing at least a first deformable lens and a second deformable lens, the first deformable lens having a first focal length, the second deformable lens having a second focal length;

disposing the first deformable lens spaced from the second deformable lens by a distance substantially equal to a sum of the first and second focal lengths; and providing an electric field on the first and second deformable lenses so as to change the first focal length by a first amount and to change the second focal length by a second amount such that a sum of the first and second amounts is substantially equal to zero.

According to the present invention, the imaging device has a chamber having a first side and an opposing second side, the first deformable lens comprising a first droplet of a first liquid having a first refractive index disposed on the first side, the second deformable lens comprising a second droplet of a second liquid having a second refractive index disposed on the second side, and wherein the chamber is filled with a third liquid between the first side and the second side in contact with the first and second droplets, the third liquid having a third refractive index, the third refractive index smaller than the first refractive index and also smaller than the second refractive index.

According to the present invention, the imaging device further comprises a first electrode layer adjacent to the first side, a second electrode layer adjacent to the second side, and at least a third electrode layer disposed in cooperative relation to the first and second electrode layers for providing the electric field.

According to the present invention, the image device further comprises a potentiometer having a first end operatively connected to the first electrode layer, a second end operatively connected to the second electrode layer and a center tap operatively connected to the third electrode layer, and wherein the first and second ends of the potentiometer are operatively connected to a voltage source for providing the electric field.

According to the present invention, the method further comprises the step of:

changing the center tap location on the potentiometer for changing the first and second focal lengths.

According to the present invention, the first refractive index is different from or substantially equal to the second refractive index.

A second aspect of the present invention provides an optical system having an optical axis. The optical system comprises:

a first deformable lens, having a first focal length, disposed substantially on the optical axis; and a second deformable lens, having a second focal length, disposed substantially on the optical axis spaced from the first deformable lens by a distance substantially equal to a sum of the first and second focal lengths.

According to the present invention, the optical system further comprises:

a plurality of electrodes, disposed in relation to the first and second deformable lenses, wherein the electrodes receive electrical power for providing an electric field on the first deformable lens to change the first focal length by a first amount and on the second deformable lens to change the second focal length by a second amount, such that a sum of the first and second amounts is substantially equal to zero.

According to the present invention, the first deformable lens comprises a first liquid droplet disposed on a first surface adjacent to at least one of the electrodes, and the second deformable lens comprises a second liquid droplet disposed on a second surface adjacent to at least another one of the electrodes. The first surface and the second surface are inner surfaces of an enclosed chamber filled with another liquid different from the first liquid droplet and the second liquid droplet.

The third aspect of the present invention provides an imaging device for forming images at a plurality of magnification factors, said device comprising:

an optical system having a first end and a second end along an optical axis, the optical system comprising:

a first deformable lens, having a first focal length, disposed near the first end;

a second deformable lens having a second focal length, disposed at the second end, wherein the first deformable lens is spaced from the second deformable lens by a distance substantially equal to a sum of the first and second focal lengths; and a plurality of electrodes, disposed in relation to the first and second deformable lenses, wherein the electrodes receive electrical power for providing an electric field on the first deformable lens to change the first focal length, and on the second deformable lens to change the second focal length; and an optical component, disposed adjacent to the second end of the optical system along the optical axis for image formation.

According to the present invention, the imaging device further comprises:

an electrical device, disposed in relation to the first and second deformable lenses, for providing the electrical power to the electrodes.

According to the present invention, the electrodes comprise:

a common electrode, a first electrode adjacent to the first deformable lens and in a cooperative relation with the common electrode to provide the electric field substantially to the first deformable lens, and a second electrode adjacent to the second deformable lens and in a cooperative relation with the common electrode to provide the electric field substantially to the second deformable lens.

According to the present invention, the electrical device comprises a potentiometer having:

a center tap operatively connected to the common electrode;

a first end operatively connected to the first electrode; and a second end operatively connected to the second electrode, wherein the first and second ends are operatively connected to a voltage source to provide the electrical power to the first and second electrodes, and wherein the position of the center tap in relation to the first end can be changed so as to change the electric field on the first and the second deformable lenses.

The fourth aspect of the present invention provides a portable device comprising:

a voltage control mechanism;

an optical system having a first end and a second end along an optical axis, the optical system comprising:

a first deformable lens, having a first focal length, disposed near the first end;

a second deformable lens having a second focal length, disposed at the second end, wherein the first deformable lens is spaced from the second deformable lens by a distance substantially equal to a sum of the first and second focal lengths; and a plurality of electrodes disposed in relation to the first and second deformable lenses, operatively connected to the voltage control mechanism for providing a first electric field on the first deformable lens and a second electric field on the second deformable lens so as to change the first focal length by a first amount and to change the second focal length by a second amount, such that a sum of the first and second amount is substantially equal to zero; and an image forming component, disposed adjacent to the second end of the optical system along the optical axis for image formation at an image plane.

The portable device can be a mobile terminal or the like.

The present invention will become apparent upon reading the description taken in conjunction with FIGS. 2 to 5.

DETAILED DESCRIPTION OF THE INVENTION

The present invention uses two liquid lenses aligned to form an afocal zoom-system. A voltage control system is used to deform the liquid lenses thereby changing the focal lengths of the liquid lens. The voltage control is designed such that the sum of their focal lengths in a desirable range of angular magnification is substantially unchanged. As such, there is no need to change the separation distance between the two liquid lenses. The present invention uses electrowetting (EW) technology to provide the required liquid lenses. In EW technology, a droplet of liquid is placed on a substrate to function as a lens. The contact angle of the droplet is usually a function of the surface tension of the liquid under the influence of the surface properties of the substrate. When an electric field is applied to the liquid droplet, the electric field modifies the surface tension at the liquid-solid interface, causing a change in the contact angle. The change in the contact angle causes a change in the surface curvature of the droplet and thus its focal length. The electric field can be achieved by a pair of electrodes disposed on different sides of the liquid droplet.

EW technology is known in the art. Kroupenkine et al. (EP 1 271 218 A1) discloses disposing a liquid droplet on a substrate as a liquid lens having a focal length and applying a voltage on the liquid droplet in order to change the focal length. Kroupenkine et al. also discloses having a plurality of electrodes adjacent to the liquid droplet and applying different voltage potentials on the electrodes so as to move the liquid droplet from one location of the substrate to another. Kroupenkine et al. describes how the contact angle is changed in terms of applied voltage. Berge et al. (U.S. Pat. No. 6,369,954 B1) discloses having a chamber filled with a first liquid and a drop of second liquid, and applying a voltage on the electrodes surrounding the chamber so as to change the focal length of the liquid drop. Onuki et al. (EP 1 069 450 A2) also discloses having a chamber filled with a first liquid and a drop of second liquid, and applying a voltage so as to change the focal length. Onuki et al. additionally discloses that the height of the chamber is limited so as to change the focusing properties of the liquid drop when the applied voltage exceeds a value. Feenstra et al. (WO 03/069380 A1) discloses having a cylindrical compartment filled with a first fluid and a second fluid, wherein the fluid contact layer of both the first and the second fluids has a cylindrical inner wall.

Figure 1:
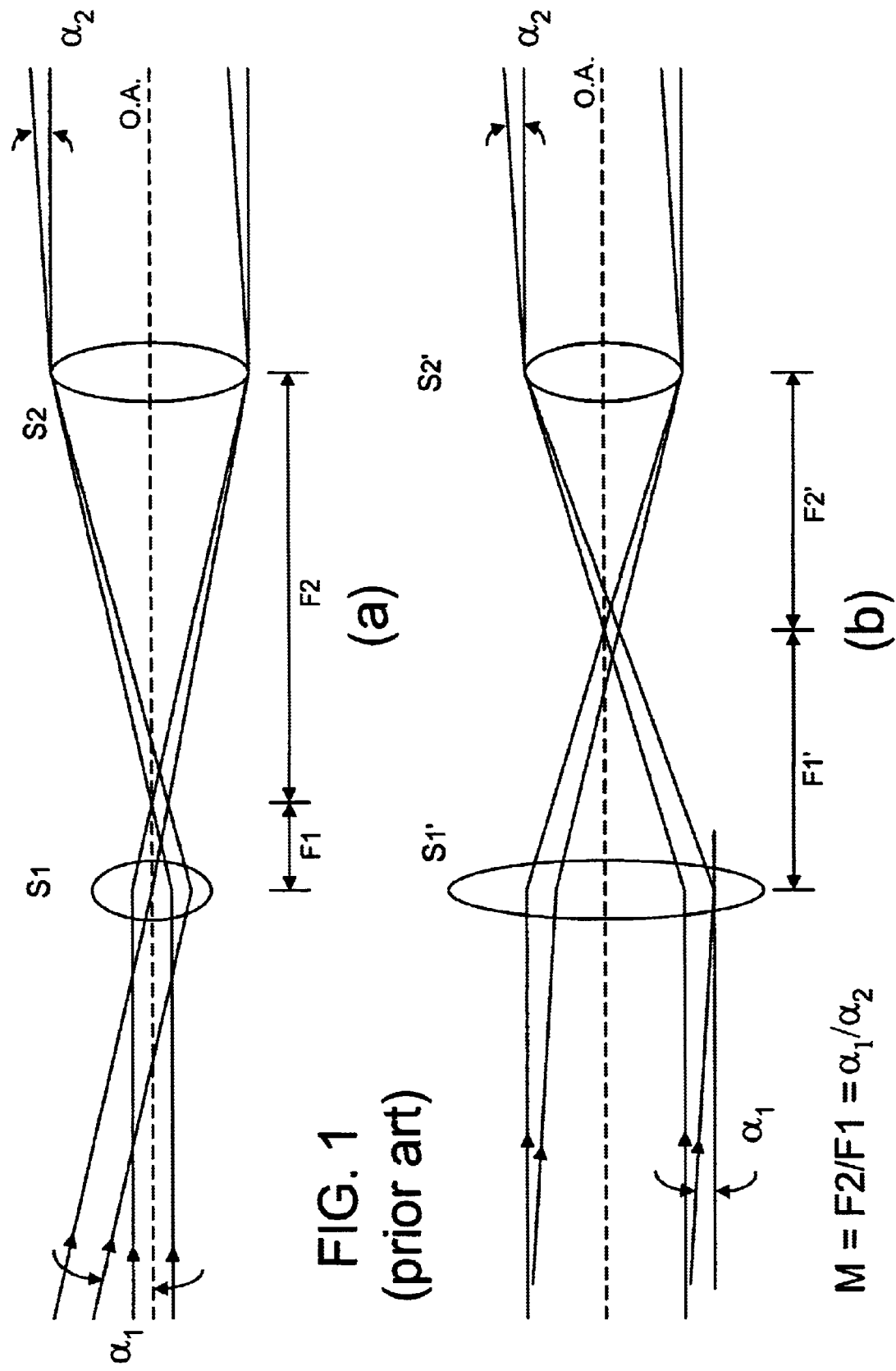
FIG. 1a is a schematic representation illustrating a conventional afocal zoom-system.
FIG. 1b is a schematic representation illustrating the afocal zoom-system of FIG. 1b with a different angular magnification.
FIG. 1c is a schematic representation illustrating an imaging system having an afocal zoom system.
Figure 1C:
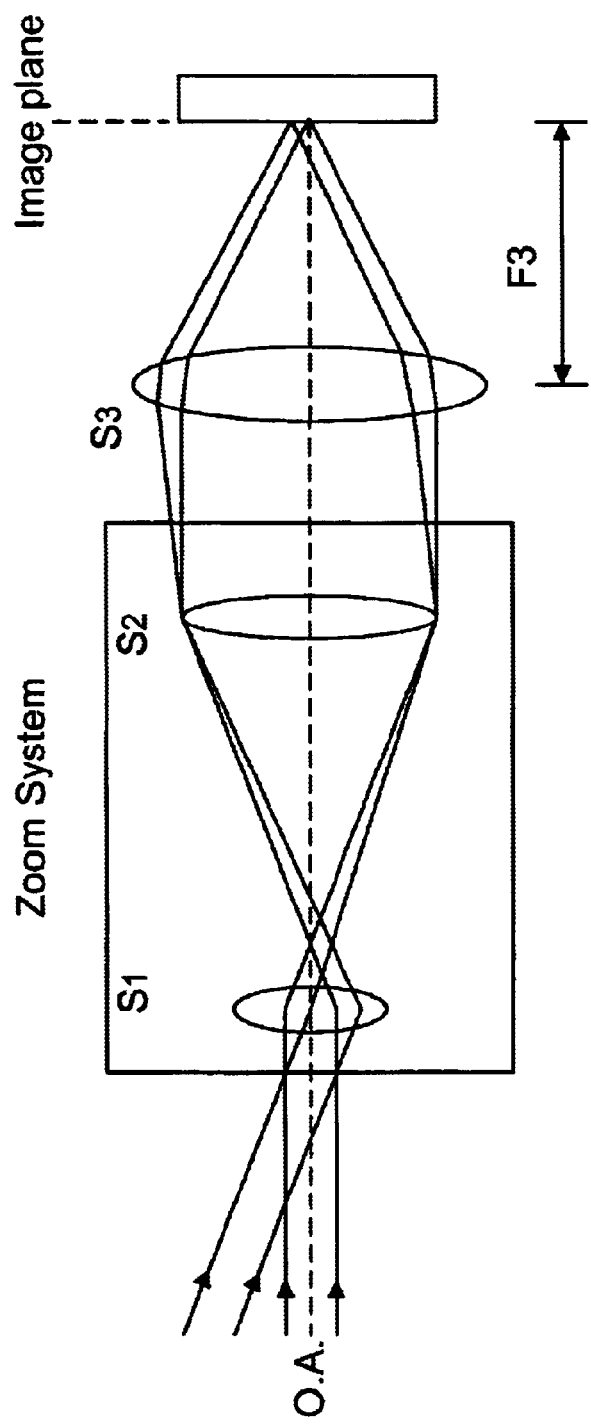
Figure 2A:
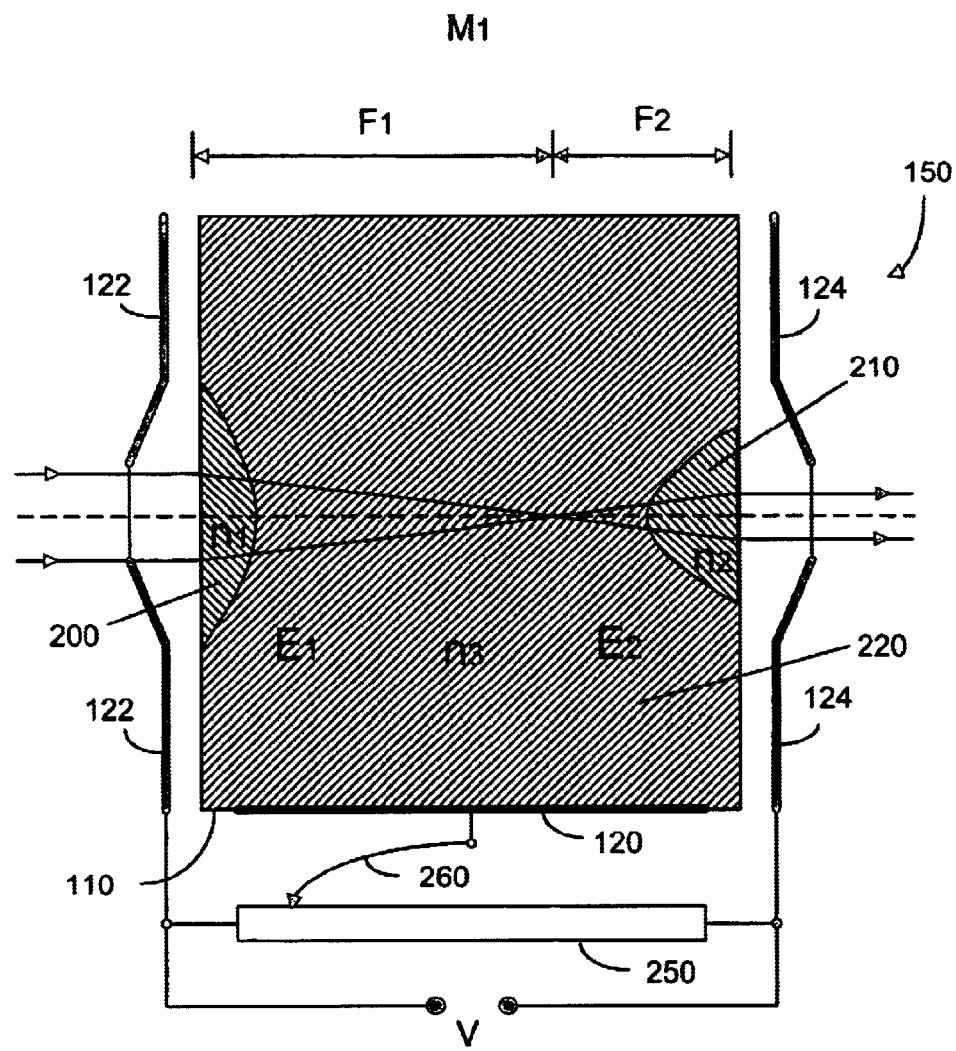
FIG. 2 is a schematic representation illustrating an afocal system, according to the present invention.
Figure 2B:
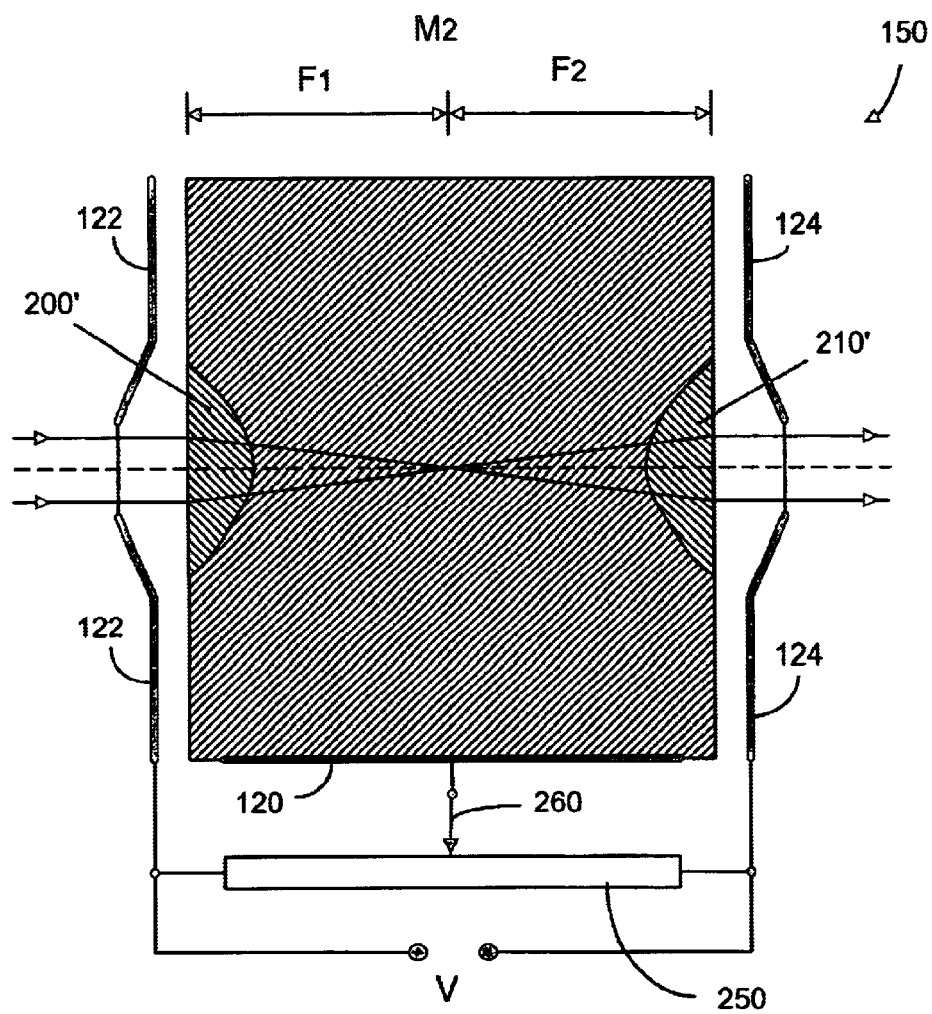
Figure 2C:
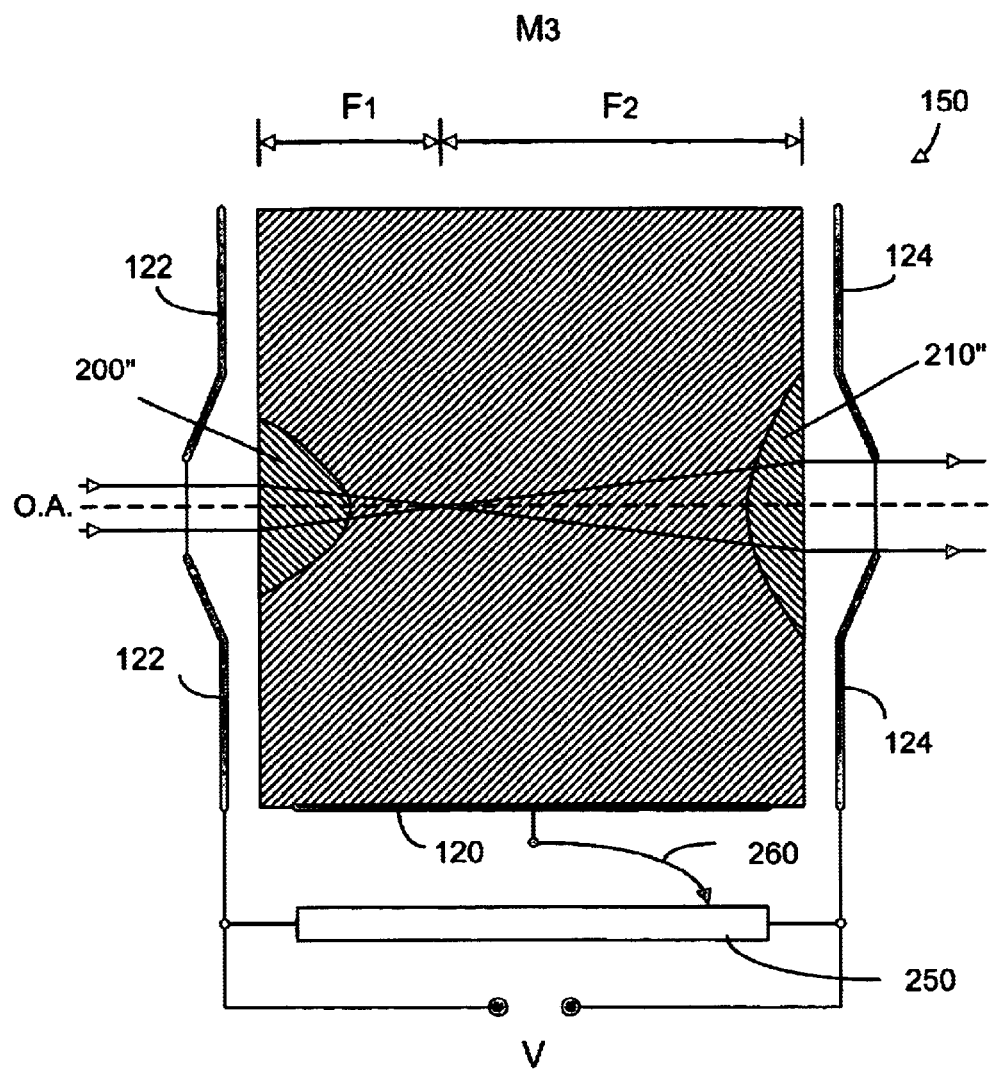

The afocal zoom-system of the present invention is based on the electrowetting double cell as shown in FIGS. 2a–2c. As shown in these figures, the zoom-system 150 of the present invention comprises a common chamber 110. Two liquid droplets 200, 210 are placed in the common chamber 110 filled with another liquid 220, which is non-miscible with liquid droplets 200, 210. The refractive indices of the liquid droplets 200, 210 and the liquid 220 are $n_1$, $n_2$ and $n_3$, with $n_1 > n_3$ and $n_2 > n_3$, so that the liquid droplets function as positive lenses. $n_1$ can be equal to or different from $n_2$. As shown in FIGS. 2a–2c, the liquid droplet 200 is adjacent to an electrode 122, and the liquid droplet 210 is adjacent to an electrode 124. A third electrode 120 is placed adjacent to a different wall on the chamber 110 so as to provide an electric field $E_1$ to the droplet 200 and another electric field $E_2$ to the droplet 210. The common voltage source to the electrodes 120, 122 and 124 is denoted by V. A potentiometer 250 is connected across the voltage source V and a movable electrical contact or center tap 260 are used to change the electric fields $E_1$ and $E_2$.

Assuming a linear dependence of the focal length of a liquid lens 200, 210 on the applied voltage, the sum of the two focal lengths ($F_1+F_2$) will stay constant, while the ratio of the focal lengths, $F_2/F_1$ (and thus the angular magnification) is caused to change. Under the assumption that the focal length of the liquid lens is linearly dependent on the applied voltage, changing the position of the center tap 260 on a potentiometer 250 will change the angular magnification of the zoom-system 150. FIG. 2a shows a position of the center tap 260 on the potentiometer 250 such that $F_1 > F_2$ or the angular magnification $M_1 < 1$. FIG. 2b shows a position of the center tap 260 on the potentiometer 250 such that $F_1 = F_2$ or the angular magnification $M_2 = 1$. FIG. 2c shows a position of the center tap 260 on the potentiometer 250 such that $F_1 < F_2$ or the angular magnification $M_3 > 1$.

Figure 3:
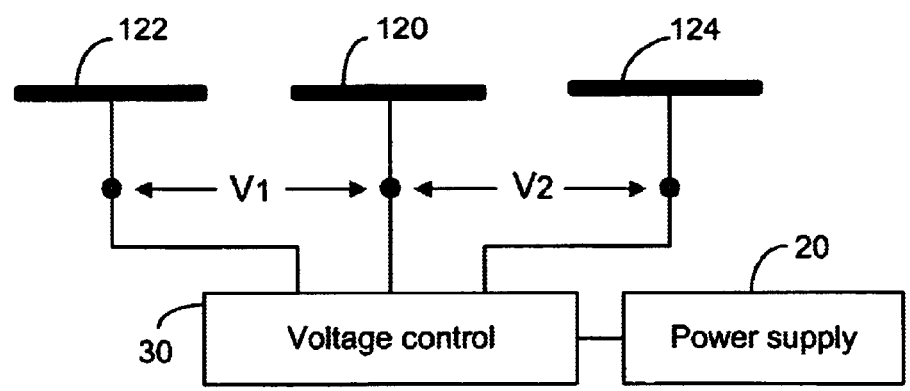
FIG. 3 is a schematic representation illustrating a voltage control system.

If the focal length of the liquid lens is not linearly dependent on the applied voltage, it is possible to use two voltage sources $V_1$ and $V_2$ on the electrodes 120, 122 and 124 and change these voltage sources in a coordinated way so that the sum of the focal lengths ($F_1+F_2$) of two liquid lens 200, 210 is constant within a certain range of zoom factors. As shown in FIG. 3, a power supply 20 is operatively connected to a voltage control module 30 to control and change the electric fields $E_1$ and $E_2$ (see FIG. 2a).

Figure 4:
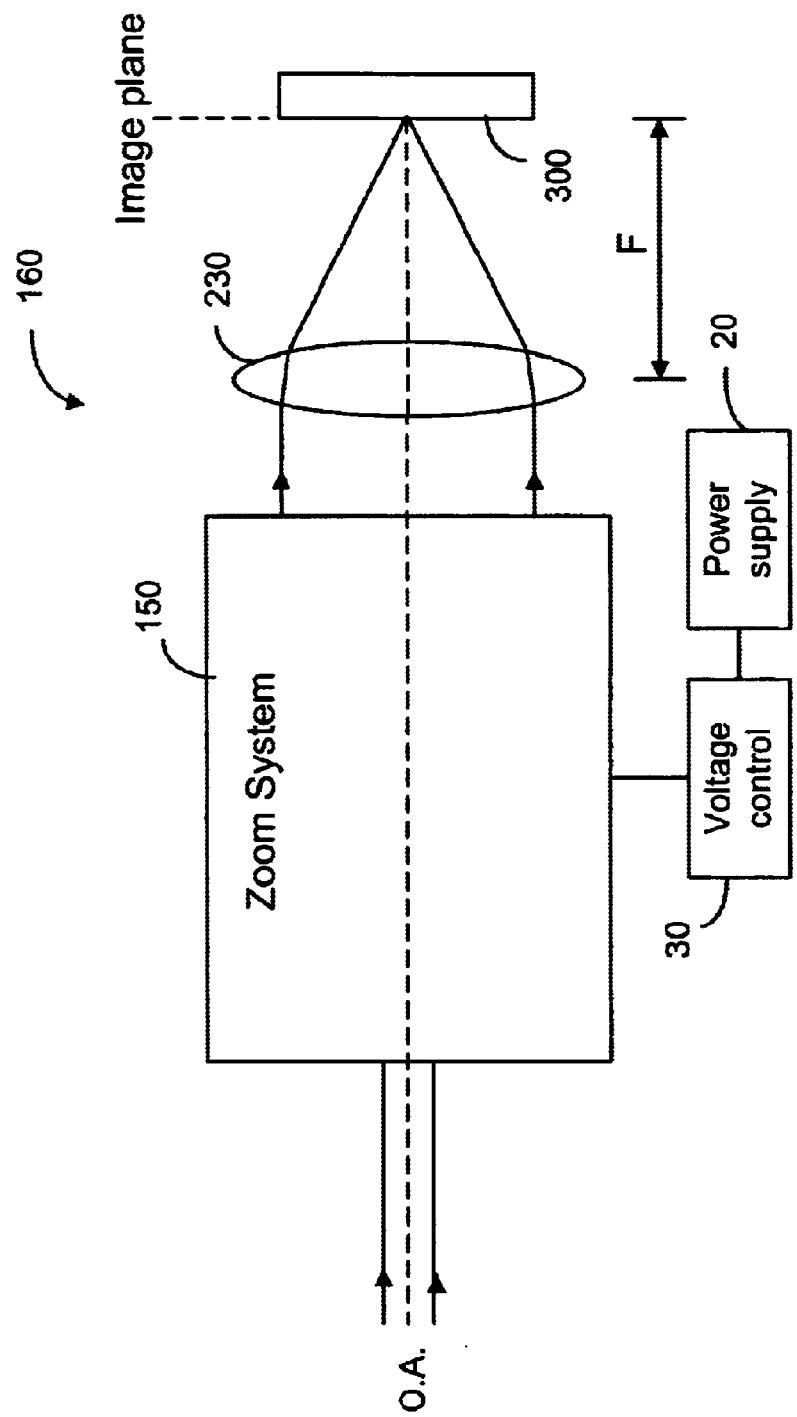
FIG. 4 is a schematic representation illustrating an imaging system, according to the present invention.

The zoom-system 150, according to the present invention, can be used in an imaging system with variable magnification as shown in FIG. 4. As shown, a lens (or a group of lenses) 230 is disposed behind the zoom-system 150 to form a real image on the image plane. The combination of the lens 230 and the zoom-system 150 is herein referred to as an optical system 160. Furthermore, an image sensing or recording medium, such as an imaging sensor array 300, can be placed at the image plane of the optical system 160 to acquire images.

Because the image plane is located substantially at the focal plane of the lens 230 and the distance between the lens 230 and the zoom-system 150 does not substantially alter the focusing property the optical system 160, it is usually unnecessary to adjust the relative distance among the sensor array 300, the lens 230 and the zoom-system 150. Furthermore, no mechanical movement is required to change the angular magnification of the zoom-system 150. The entire imaging system, including the zoom-system 150, the lens 230 and the imaging sensor array 300, can be made very small. As such, the imaging system can be used in a small portable device, such as a mobile phone.

Figure 5:
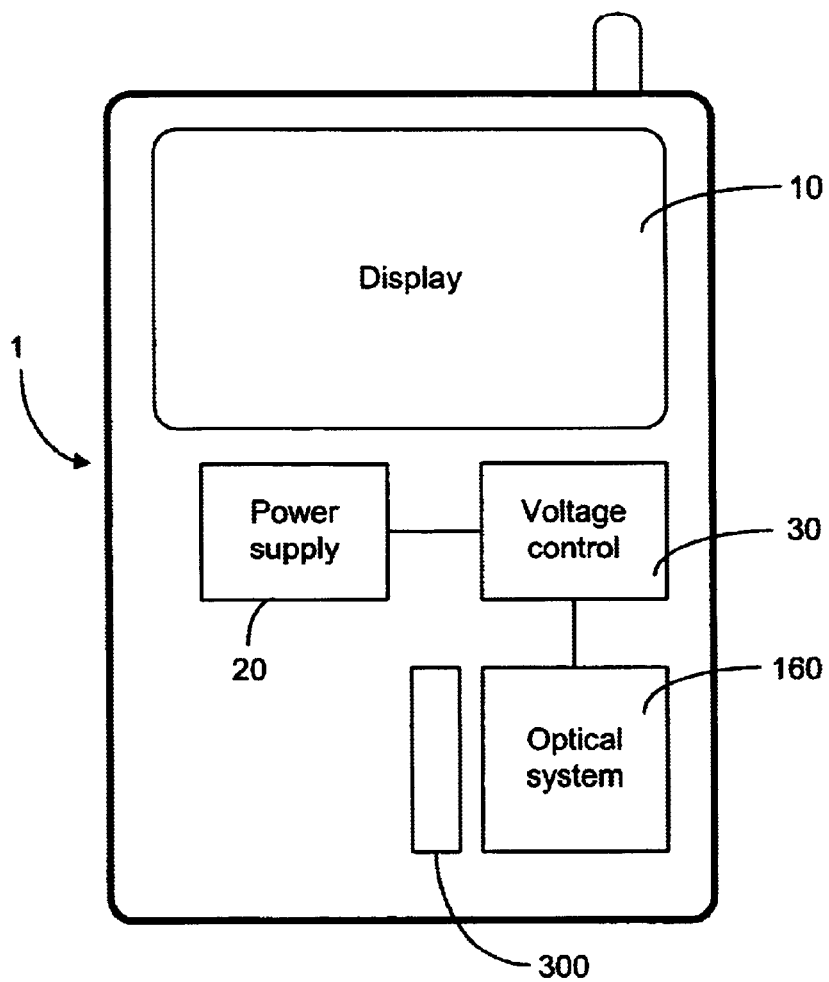
FIG. 5 is a schematic representation illustrating a portable device having the imaging system, according to the present invention.

As shown in FIG. 5, a portable device 1 comprises an optical system 160, according to the present invention. The device 1 further comprises an imaging sensor array 300 for image acquisition. A power supply 20 and a voltage control module 30 are used to change the magnification of the imaging system. It is advantageous to have a display 10 so as to allow a user to see the image formed on the imaging sensor array 300. The voltage control 30 is designed to keep the sum of the focal lengths of the liquid lenses 200, 210 unchanged while changing the angular magnification of the zoom-system 150. The control is at least partially based on the electrowetting properties of the liquid lenses 200, 210 and the refractive indices of the lenses 200, 210 and the liquid 220. The control may also be based on the location, the shape of the electrodes 120, 122, 124. In some cases, it may be possible to use a potentiometer 250 and a center tap 260, as shown in FIGS. 2a–2c.

Figure 6B:
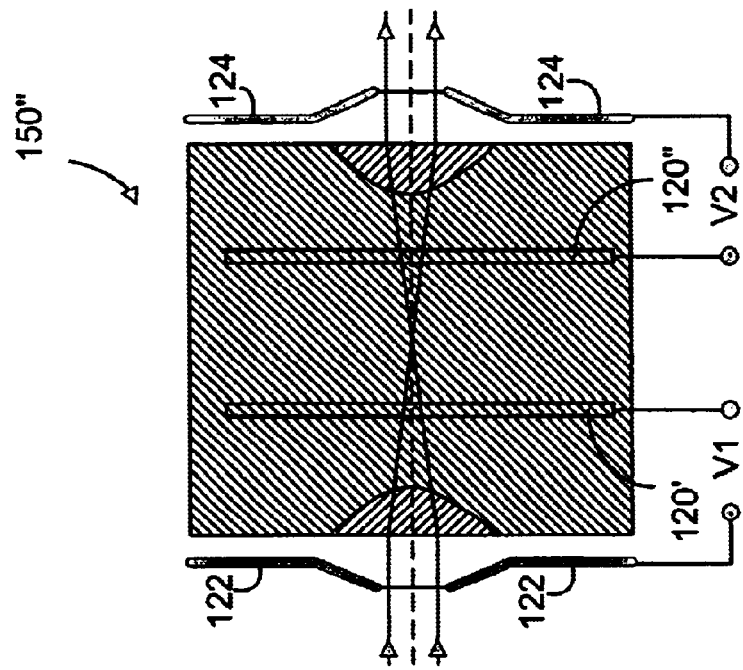
FIG. 6B shows a zoom-system having two sets of electrodes.
Figure 6A:
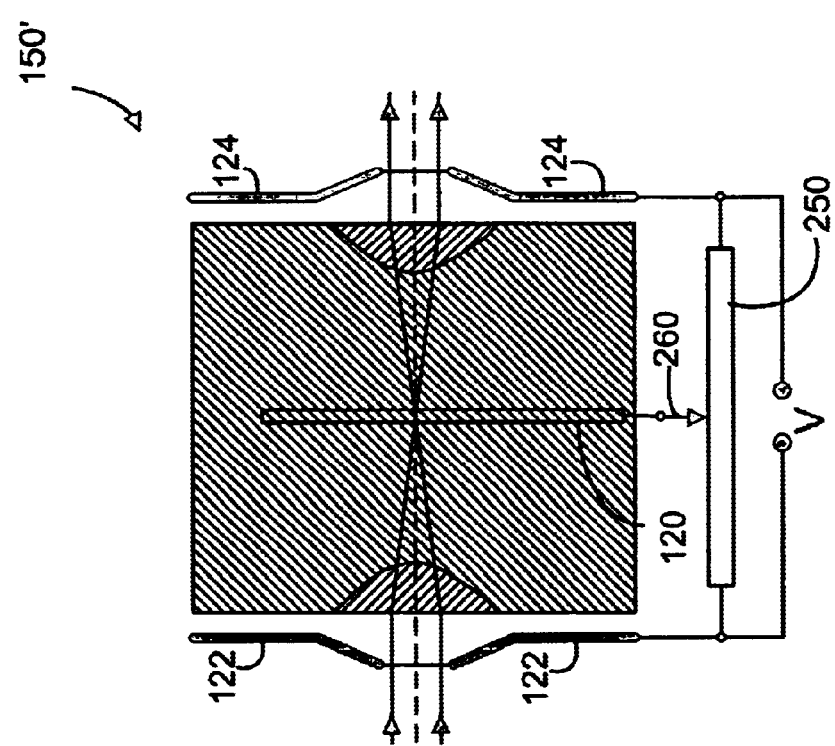
FIG. 6A shows a zoom-system having a common electrode.

The zoom-system 150 can be used in a portable device 1, such as a mobile phone, a communicator, a personal digital assistant (PDA) and the like. The zoom-system 150 can also be used in a stand-alone camera, for example. Furthermore, the common electrode 120 can be made of substantially transparent material to be placed within the chamber 150', as shown in FIG. 6a. The separate electric fields $E_1$ and $E_2$ can also be achieved by have two separate sets of electrodes as shown in FIG. 6b.

It should be noted that the liquid lens 200 and the liquid lens 210 can be formed from droplets of the same liquid, or from two different liquids.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for changing a magnification factor of an imaging device, said method comprising:

providing at least a first deformable lens and a second deformable lens, the first deformable lens having a first focal length, the second deformable lens having a second focal length;

disposing the first deformable lens spaced from the second deformable lens by a distance substantially equal to a sum of the first and second focal lengths; and providing an electric field on the first and second deformable lenses so as to change the first focal length by a first amount and to change the second focal length by a second amount such that a sum of the first and second amounts is substantially equal to zero.

2. The method of claim 1, wherein the imaging device has a chamber having a first side and an opposing second side, the first deformable lens comprising a first droplet of a first liquid having a first refractive index disposed on the first side, the second deformable lens comprising a second droplet of a second liquid having a second refractive index disposed on the second side, and wherein the chamber is filled with a third liquid between the first side and the second side in contact with the first and second droplets, the third liquid having a third refractive index, the third refractive index smaller than the first refractive index and also smaller than the second refractive index.

3. The method of claim 2, wherein the imaging device further comprises a first electrode layer adjacent to the first side, a second electrode layer adjacent to the second side, and at least a third electrode layer disposed in cooperative relation to the first and second electrode layers for providing the electric field.

4. The method of claim 3, wherein the image device further comprises a potentiometer having a first end operatively connected to the first electrode layer, a second end operatively connected to the second electrode layer and a center tap operatively connected to the third electrode layer, and wherein the first and second ends of the potentiometer are operatively connected to a voltage source for providing the electric field.

5. The method of claim 4, further comprising:
changing the center tap location on the potentiometer for changing the first and second focal lengths.

6. The method of claim 2, wherein the first refractive index is different from the second refractive index.

7. The method of claim 2, wherein the first refractive index is substantially equal to the second refractive index.

8. An optical system having an optical axis, comprising:
a first deformable lens, having a first focal length, disposed substantially on the optical axis; and
a second deformable lens, having a second focal length, disposed substantially on the optical axis spaced from the first deformable lens by a distance substantially equal to a sum of the first and second focal lengths.

9. The optical system of claim 8, further comprising:
a plurality of electrodes, disposed in relation to the first and second deformable lenses, wherein the electrodes receive electrical power for providing an electric field on the first deformable lens to change the first focal length by a first amount and on the second deformable lens to change the second focal length by a second amount, such that a sum of the first and second amounts is substantially equal to zero.

10. The optical system of claim 8, wherein the first deformable lens comprises a first liquid droplet disposed on a first surface adjacent to at least one of the electrodes, and the second deformable lens comprises a second liquid droplet disposed on a second surface adjacent to at least another one of the electrodes.

11. The optical system of claim 10, wherein the first surface and the second surface are inner surfaces of an enclosed chamber filled with another liquid different from the first liquid droplet and the second liquid droplet.

12. An imaging device for forming images at a plurality of magnification factors, said device comprising:
an optical system having a first end and a second end along an optical axis, the optical system comprising:
a first deformable lens, having a first focal length, disposed near the first end;
a second deformable lens having a second focal length, disposed at the second end, wherein the first deformable lens is spaced from the second deformable lens by a distance substantially equal to a sum of the first and second focal lengths; and
a plurality of electrodes, disposed in relation to the first and second deformable lenses, wherein the electrodes receive electrical power for providing an electric field on the first deformable lens to change the first focal length, and on the second deformable lens to change the second focal length; and
an optical component, disposed adjacent to the second end of the optical system along the optical axis for image formation.

13. The imaging device of claim 12, further comprising:
an electrical device, disposed in relation to the first and second deformable lenses, for providing the electrical power to the electrodes.

14. The imaging device of claim 13, wherein the electrodes comprise:
a common electrode,
a first electrode adjacent to the first deformable lens and in a cooperative relation with the common electrode to provide the electric field substantially to the first deformable lens, and
a second electrode adjacent to the second deformable lens and in a cooperative relation with the common electrode to provide the electric field substantially to the second deformable lens.

15. The imaging device of claim 14, wherein the electrical device comprises a potentiometer having:
a center tap operatively connected to the common electrode;
a first end operatively connected to the first electrode; and
a second end operatively connected to the second electrode, wherein the first and second ends are operatively connected to a voltage source to provide the electrical power to the first and second electrodes, and wherein the position of the center tap in relation to the first end can be changed so as to change the electric field on the first and the second deformable lenses.

16. A portable device comprising:
a voltage control mechanism;
an optical system having a first end and a second end along an optical axis, the optical system comprising:
a first deformable lens, having a first focal length, disposed near the first end;
a second deformable lens having a second focal length, disposed at the second end, wherein the first deformable lens is spaced from the second deformable lens by a distance substantially equal to a sum of the first and second focal lengths; and
a plurality of electrodes disposed in relation to the first and second deformable lenses, operatively connected to the voltage control mechanism for providing a first electric field on the first deformable lens and a second electric field on the second deformable lens so as to change the first focal length by a first amount and to change the second focal length by a second amount, such that a sum of the first and second amount is substantially equal to zero; and
an image forming component, disposed adjacent to the second end of the optical system along the optical axis for image formation at an image plane.

17. The portable device of claim 16, comprising a mobile terminal.

* * * * *